United States Patent
MacDonald

(10) Patent No.: US 12,072,271 B2
(45) Date of Patent: *Aug. 27, 2024

(54) PLANAR VIBRATORY VISCOMETER, VISCOMETER MEMBER, AND RELATED METHOD

(71) Applicant: MICRO MOTION, INC., Boulder, CO (US)

(72) Inventor: George Alexander MacDonald, Wokingham (GB)

(73) Assignee: MICRO MOTION, INC., Boulder, CO (US)

( * ) Notice: Subject to any disclaimer, the term of this patent is extended or adjusted under 35 U.S.C. 154(b) by 539 days.

This patent is subject to a terminal disclaimer.

(21) Appl. No.: 17/296,816

(22) PCT Filed: Dec. 12, 2018

(86) PCT No.: PCT/US2018/065248
§ 371 (c)(1),
(2) Date: May 25, 2021

(87) PCT Pub. No.: WO2020/122901
PCT Pub. Date: Jun. 18, 2020

(65) Prior Publication Data
US 2022/0003650 A1    Jan. 6, 2022

(51) Int. Cl.
*G01N 11/16* (2006.01)
*G01N 9/00* (2006.01)

(52) U.S. Cl.
CPC .............. *G01N 11/16* (2013.01); *G01N 9/002* (2013.01); *G01N 2009/006* (2013.01)

(58) Field of Classification Search
CPC ... G01N 11/16; G01N 9/002; G01N 2009/006
See application file for complete search history.

(56) References Cited

U.S. PATENT DOCUMENTS 4,480,461 A    11/1984   Ponzi
5,559,291 A *  9/1996   Hasegawa .............. G01C 19/56
                                                    73/504.12

(Continued)

FOREIGN PATENT DOCUMENTS

DE    102014115566 A1    5/2015
WO       0122056 A1    3/2001
WO    2012166395 A2    12/2012

OTHER PUBLICATIONS

Cakmak O et al, Precision density and viscosity measurement using two cantilevers with different widths, Science Direct, Sensors and Actuators A: Physical, Aug. 1, 2015, pp. 141-147, vol. 232, XP055618460.

*Primary Examiner* — Tarun Sinha
(74) *Attorney, Agent, or Firm* — The Ollila Law Group LLC

(57) ABSTRACT

A viscometer (700) is provided, for determining a viscosity of a gas therein. The viscometer (700) comprises a driver (704) and a planar vibratory member (500, 600) vibratable by the driver (704), that comprises a body (502) and a vibratable portion (504) emanating from the body (502), wherein the vibratable portion (504) comprises a plurality of vibratable cantilevered projections. At least one pickoff sensor (706) is configured to detect vibrations of the vibratory member (500, 600). Meter electronics (900) comprise an interface (901) configured to send an excitation signal to the driver (704) and to receive a vibrational response from the at least one pickoff sensor (706), measure a Q and resonant frequency of the planar vibratory member (500, 600), and to determine a viscosity (923) of the gas therein using the measured Q and the measured resonant frequency.

8 Claims, 10 Drawing Sheets

(56) References Cited

U.S. PATENT DOCUMENTS

| | | | | |
|---|---|---|---|---|
| 6,079,255 | A * | 6/2000 | Binnig | G01Q 70/10 |
| | | | | 850/37 |
| 6,311,549 | B1 * | 11/2001 | Thundat | G01N 29/30 |
| | | | | 73/54.24 |
| 7,072,775 | B2 | 7/2006 | Hemp et al. | |
| 7,434,457 | B2 | 10/2008 | Goodwin et al. | |
| 8,291,750 | B1 * | 10/2012 | Goodbread | G01N 11/16 |
| | | | | 73/61.79 |
| 10,175,212 | B2 | 1/2019 | Andreucci et al. | |
| 2002/0178787 | A1 * | 12/2002 | Matsiev | G10K 11/02 |
| | | | | 73/24.01 |
| 2002/0194906 | A1 | 12/2002 | Goodwin et al. | |
| 2010/0095774 | A1 | 4/2010 | Sone et al. | |
| 2011/0061452 | A1 | 3/2011 | King et al. | |
| 2013/0139576 | A1 * | 6/2013 | Goodbread | G01N 9/002 |
| | | | | 73/64.53 |
| 2015/0308990 | A1 | 10/2015 | Andreucci et al. | |
| 2016/0108729 | A1 | 4/2016 | Li et al. | |
| 2016/0290133 | A1 | 10/2016 | Xia et al. | |

* cited by examiner

PLANAR VIBRATORY VISCOMETER, VISCOMETER MEMBER, AND RELATED METHOD

TECHNICAL FIELD

The present invention relates to vibratory meters, and more particularly, to a method and apparatus for measuring viscosity with a planar member.

BACKGROUND OF THE INVENTION

Viscosity is a fluid characteristic that describes flow resistance. A common definition of viscosity is a measure of the internal friction of a fluid. In particular, this internal friction becomes apparent when a layer of fluid is made to move in relation to another layer. Thus, viscosity is often described as the resistance experienced by one portion of a material moving over another portion of that material. Viscosity is commonly used to characterize petroleum fluids, such as fuels, oils, and lubricants, and often they are specified in the trading and classification of petroleum products. For example, kinematic viscosity for petroleum products is commonly measured in a capillary viscometer by a standard method such as that described by the American Society for Testing and Materials (ASTM) D445 standard. Such measurements involve measuring the time for a fixed amount of liquid to flow under gravity through a calibrated glass capillary under a repeatable force at a given temperature. The capillary tube viscometer has been principally defined by the Hagen-Poiseuille Equation especially for Newtonain fluids. In a Newtonian fluid the shear stress is proportional to the shear rate, and the proportionality constant is called the viscosity. To measure viscosity with a capillary tube viscometer, the pressure drop and flow rate are independently measured and correlated to some standard fluid of known viscosity. Therefore, this methodology is considered to be accurate for liquids, but gas viscosity must be measured via different means.

It is often desirable to determine the viscosity of a gas flowing in a pipe or conduit. This is done since, in many industrial processes, it is necessary that the flowing material be maintained at a specified viscosity. Measurement of gas viscosity can be very useful; it can be used directly to determine Reynold's number and hence determine correction factors for Orifice and Turbine Gas flowmeters. It can also be used with other parameters such as gas density, velocity of sound, or thermal conductivity to determine useful properties such as gas compressibility or gas energy using inferential calculation methods. The density of a gas increases as the pressure is increased while the mean free path is decreased as the pressure is increased, hence the viscosity of a gas is substantially independent of gas pressure.

Meters that utilize mechanical resonators, such as vibratory tuning forks, have found some success in the field of viscosity measurement. Measurement of liquid viscosity using a mechanical resonator may be derived by balancing the Navier Stokes equation and Newton's Laws of Motion, yielding an equation of the form:

$$\eta = A + \frac{B}{Q^2} \times \frac{1}{\rho \times \omega_0^3} \tag{1}$$

Where $\eta$ is the fluid viscosity, $\rho$ is the fluid density, $\omega_0$ is the angular resonant frequency undamped ($2\pi f_0$), A is a constant relating to the Q of the resonator in vacuum, and B is a constant relating to the stiffness, mass and geometry of the sensor. The Q is a dimensionless parameter that describes how underdamped an oscillator or resonator is.

The density and resonant frequency are related by an equation of the form:

$$\rho = C + \frac{D}{f^2} \tag{2}$$

Where C and D are constants relating to the stiffness, mass and geometry of the resonator thus giving:

$$\eta = A + \frac{B}{Q^2} \times \frac{1}{\left(C + \frac{D}{f^2}\right) \times (2\pi f_0)^3} \tag{3}$$

For simplicity the resonant frequency can be regarded as the same as $f_0$, which is the undamped resonant frequency. For many practical applications a viscosity sensor would be calibrated on similar fluids to those measured in the field, and hence the frequency would be unchanged, so the frequency can be regarded as a constant, and hence the equation can take a form similar to the following:

$$\eta = A + \frac{E}{Q^2} \tag{4}$$

Where E is essentially a constant based upon the stiffness, mass and geometry of the sensor and the nominal resonant frequency. The equations provided are provided as non-limiting examples.

The principle of using a vibrating sensor for measurement of liquid viscosity is well known. An example of which is the Micro Motion Fork Viscosity Meter (FVM) that is based upon the vibrating-element principle whereby the resonant properties are influenced by the density and viscosity of the fluid. The FVM utilizes this operational principle to determine liquid viscosity. In particular, viscosity is determined by measuring the quality factor (Q) of the resonance and hence damping of the resonator. For example, without limitation, Equation 5 describes one possible method for determining viscosity:

$$\text{Viscosity} = V_0 + V_2/Q^2 \tag{5}$$

Where:

$V_0$ and $V_2$ are calibration constants.

The above equation has been shown to work well for most liquid viscosity measurement applications.

The situation with regard to gas measurement is slightly different due to the fact that gases have a much higher compressibility, hence the density of the gas is more or less proportional to the pressure. For example, a gas at 5 bar will have more or less five times the density of the same gas at 1 bar. Thus, Equation (3) is more applicable to a gas viscosity sensor than Equation (5), so to obtain a measurement of gas viscosity, a measurement of Q and frequency is required.

In order to measure viscosity with a reasonable level of accuracy, it is desirable that the damping or energy loss in the resonator is very small compared with the energy loss in the gas. That is to say that the resonator must have a high Q in a vacuum. To achieve this, the resonator must be well balanced with different regions of the resonator moving in opposite directions so that any inertial forces are essentially cancelled out at the mounting point, as is apparent by the embodiments provided herein. An example of a prior art balanced resonator is a vibrating cylinder resonator.

An important aspect of a gas viscosity sensor design is to ensure that there are no unwanted resonances within the normal operating range of the mechanical resonator. FIG. 2 illustrates the Q vs. frequency relationship of a prior art vibrating cylinder sensor. It will be clear that that there are a number of significant non-linearities, which make an accurate determination of viscosity difficult.

According to embodiments, a balanced mechanical resonator for the measurement of gas viscosity is provided. Unwanted mechanical and/or acoustic resonances are pushed outside of the operating range of the instrument, so a simpler relationship between the damping of the resonator and the viscosity of the gas is achieved, thus providing superior accuracy over prior art sensors. An advancement in the art is therefore realized.

SUMMARY OF THE INVENTION

A planar vibratory member operable for use in a vibrating gas viscometer is provided according to an embodiment. The planar vibratory member comprises a body and a vibratable portion emanating from the body, wherein the vibratable portion comprises a plurality of vibratable projections, and wherein the plurality of vibratable projections are cantilevered. The vibratable portion is operable to be vibrated by a driver.

A viscometer operable to determine a viscosity of a gas therein is provided according to an embodiment. The viscometer comprises a driver and a planar vibratory member vibratable by the driver, comprising a body and a vibratable portion emanating from the body, wherein the vibratable portion comprises a plurality of vibratable projections, and wherein the plurality of vibratable projections are cantilevered. At least one pickoff sensor is configured to detect vibrations of the vibratory member. Meter electronics is provided that comprises an interface configured to send an excitation signal to the driver and to receive a vibrational response from the at least one pickoff sensor, measure a Q of the planar vibratory member, measure a resonant frequency of the planar vibratory member, and to determine a viscosity of the gas therein using the measured Q and the measured resonant frequency.

A method for operating a vibratory viscometer is provided according to an embodiment. A vibratory viscometer is provided that comprises meter electronics in communication with at least one coil. A vibratory member is vibrated by the at least one coil. An excitation signal is received by the at least one coil. A detection signal is output from the at least one coil, wherein the at least one coil is operable to alternately act as either a driver or pickoff. A Q of the vibratory member is measured. A resonant frequency of the vibratory member is measured, and a viscosity of a gas introduced into the vibratory viscometer is determined using the measured Q and the measured resonant frequency.

Aspects

According to an aspect, a planar vibratory member operable for use in a vibrating gas viscometer is provided. The planar vibratory member comprises a body and a vibratable portion emanating from the body, wherein the vibratable portion comprises a plurality of vibratable projections, and wherein the plurality of vibratable projections are cantilevered. The vibratable portion is operable to be vibrated by a driver.

Preferably, the plurality of vibratable projections comprise three vibratable beams.

Preferably, the three vibratable beams are the same size and dimension.

Preferably, the three vibratable beams are substantially parallel to each other.

Preferably, the three vibratable beams comprise a central beam that comprises a different dimension from adjacent beams.

Preferably, the plurality of vibratable projections comprise an inner paddle nested within an outer paddle.

Preferably, a border of the body surrounds the vibratable portion.

Preferably, the vibratable portion is magnetically drivable.

According to an aspect, a viscometer operable to determine a viscosity of a gas therein is provided. The viscometer comprises a driver and a planar vibratory member vibratable by the driver, comprising a body and a vibratable portion emanating from the body, wherein the vibratable portion comprises a plurality of vibratable projections, and wherein the plurality of vibratable projections are cantilevered. At least one pickoff sensor is configured to detect vibrations of the vibratory member. Meter electronics is provided that comprises an interface configured to send an excitation signal to the driver and to receive a vibrational response from the at least one pickoff sensor, measure a Q of the planar vibratory member, measure a resonant frequency of the planar vibratory member, and to determine a viscosity of the gas therein using the measured Q and the measured resonant frequency.

According to an aspect, a method for operating a vibratory viscometer is provided. A vibratory viscometer is provided that comprises meter electronics in communication with at least one coil. A vibratory member is vibrated by the at least one coil. An excitation signal is received by the at least one coil. A detection signal is output from the at least one coil, wherein the at least one coil is operable to alternately act as either a driver or pickoff. A Q of the vibratory member is measured. A resonant frequency of the vibratory member is measured, and a viscosity of a gas introduced into the vibratory viscometer is determined using the measured Q and the measured resonant frequency.

Preferably, the at least one coil comprises a first coil and a second coil, and wherein the first and second coil are operable to receive simultaneous excitation signals, drive the vibratory member, detect a signal from the vibratory member, and provide simultaneous detection signals.

Preferably, the first coil and the second coil are magnetically opposed.

Preferably, the at least one coil comprises a single coil, wherein the single coil is operable to receive excitation signals, drive the vibratory member, detect a signal from the vibratory member, and provide detection signals.

Preferably, the Q is measured with a phase shift and phase locked loop circuit.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

In embodiments, methods and apparatuses for determine the gas viscosity using a mechanical resonator are provided.

It was noted above that unwanted resonances can interfere with the resonance of the vibrating element, thus causing increased damping which affects the accuracy of a calculated viscosity. Therefore, the designs of embodiments of vibrating element gas viscosity sensors provided ensure that there are no unwanted resonances that will interfere with the resonance of the vibrating element. Unwanted resonances fall in to two main categories: mechanical resonances and acoustic resonances in the cavity surrounding the vibrating element.

Figure 1:
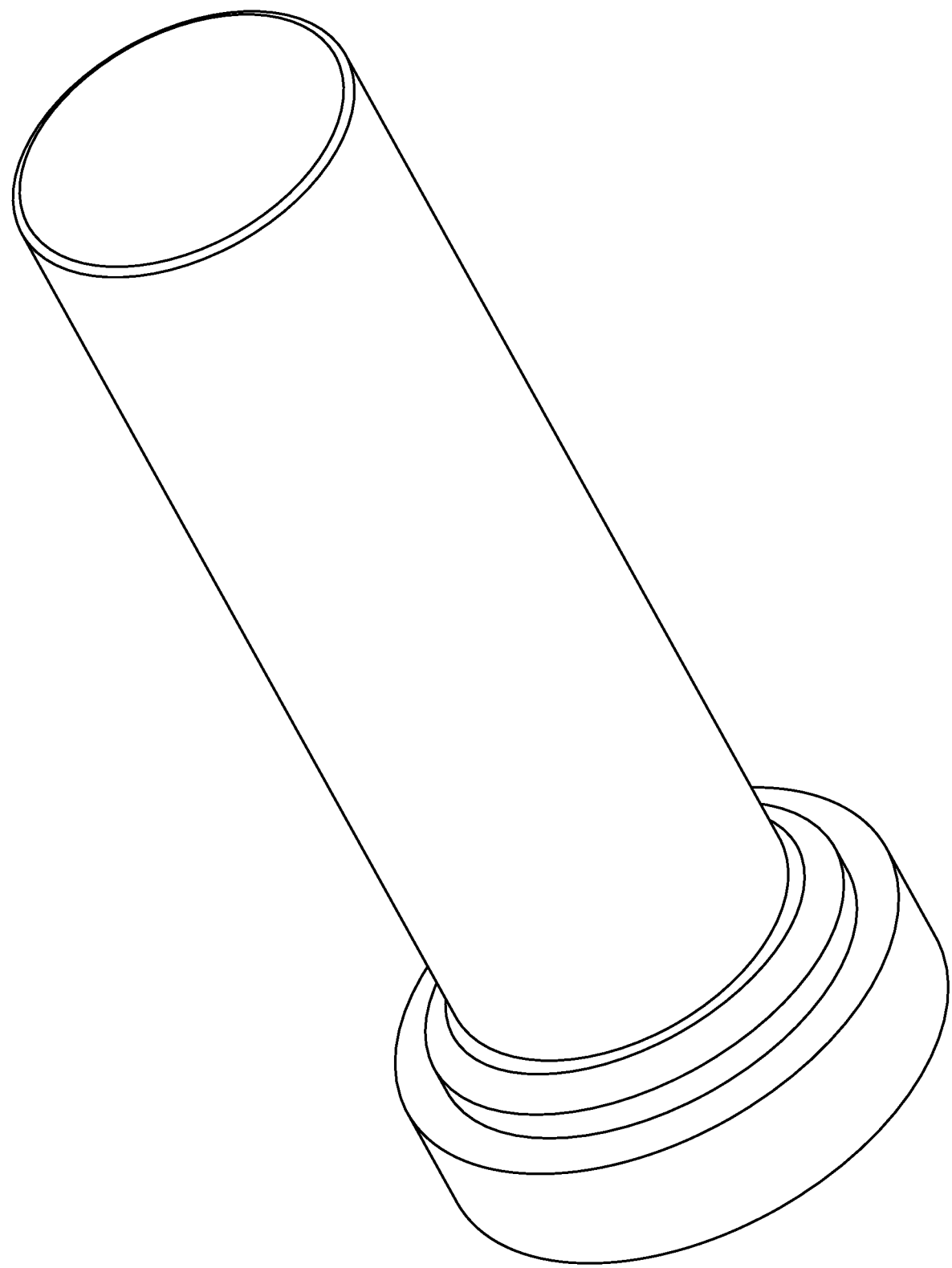
FIG. 1 shows a prior art vibrating cylinder.
Figure 2:
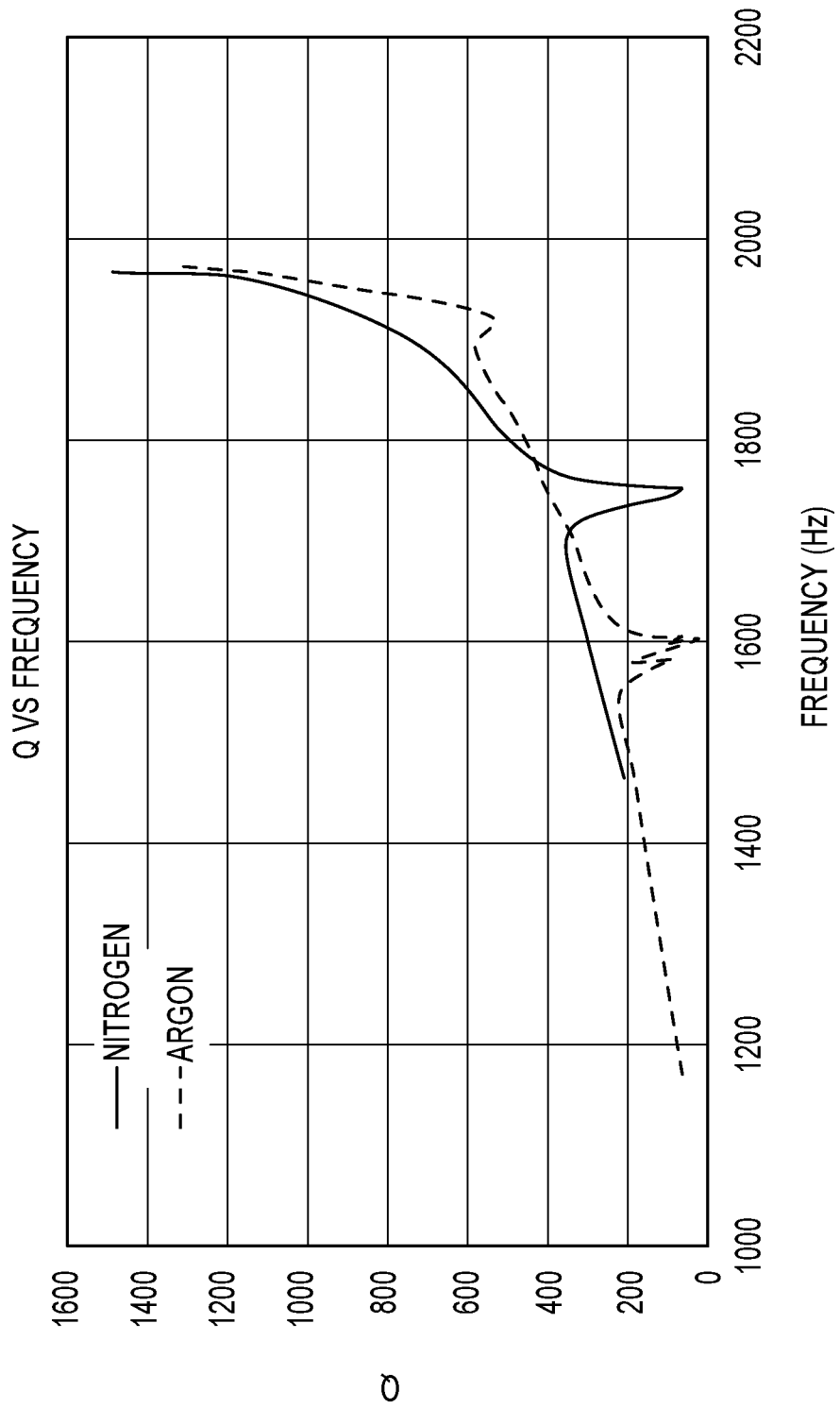
FIG. 2 illustrates dips in frequency response as a function of Q of a prior art vibrating cylinder sensor.

Generally, the mechanical resonances can be avoided by careful design verified by analytical methods such as finite element modelling, for example. In prior art designs of cylindrical member sensors, such as that illustrated by FIG. 1, it is known that spoolbody stiffness can vary, and sometimes the spoolbody flexural resonance frequency can cross over the cylinder resonance. The flexural resonance frequency of the spoolbody can, however, be increased by increasing its stiffness. This is one possible method to ensure that a flexure does not interfere with the cylinder resonance. Prior art cylindrical member sensors exhibit dips in frequency response as a function of Q, as is illustrated in FIG. 2. In this case, it is unlikely that the 'dips' are due to spoolbody flexure because they occur at different frequencies in nitrogen and argon, thus suggesting that these aberrations are due to acoustic effects.

Acoustic effects or resonances may be categorized as either longitudinal resonances, analogous to "organ pipe resonances", or Helmholtz resonances, which are commonly observed when blowing over the neck of a cylindrical member. For a closed-open pipe arrangement, the wavelengths of the resonances are approximately $\lambda/4$, $3\lambda/4$, $5\lambda/4$ etc. And for an open-open or closed-closed pipe arrangement the wavelengths of the resonances are approximately $2\lambda/4$, $4\lambda/4$, $6\lambda/4$ etc.

As an example, for illustrative purposes only, for argon, the main acoustic resonance occurs at around 300 kg/m³. If this is assumed to be a $\lambda/4$ resonance, it can be shown that this requires a characteristic cylinder length of around 85 mm. There are some possible fluid paths in prior art cylindrical members that approach or match this, but in reality the gas must pass through narrow channels which inhibits the longitudinal resonance, so this form of resonance will not be particularly strong. Additionally, it is seen that the driven acoustic mode is at a frequency two times higher than the cylinder resonance. This is because the motion of the cylinder is such that the volume inside the cylinder dilates two times every cycle, i.e. it pushes out a volume of gas two times per cycle of the cylinder vibration. In reality, the complex geometry of such cylindrical members, combined with frequency doubling characteristics, makes it difficult or impossible to accurately predict all of the acoustic modes. Helmholtz resonances are also present, which adds to the difficulty in accurately predicting acoustic models.

Helmholtz resonances are a result of the compression of gas in the volume of the cylindrical member's inner cavity that behaves like a spring, such that the kinetic energy of the gas in the neck of the opening behaves like a moving mass, hence the gas can resonate at a specific frequency if stimulated. By design the Helmholtz resonances can be made to be at a higher frequency by reducing the volume of the cavity and the length of the neck of the opening and by having a wide opening (e.g. for gas inlet or outlet).

In current embodiments, a planar resonator is provided that exhibits advantages over the prior art by avoiding unwanted acoustic resonances. As the provided embodiments of a vibratory member vibrate, this causes movement of the gas around them. The additional mass of the gas shifts the resonant frequency of the member, hence the frequency can provide an indication of the gas density. A non-limiting example of an equation relating density and frequency is of the form given below:

$$\rho = A + \frac{B}{f^2} \tag{6}$$

Where A and B are constants relating to the stiffness, mass and geometry of the resonator, $\rho$ is density and f is frequency.

The shearing of the gas results in damping of the vibration due to the viscosity of the gas. The Quality factor (Q) of the resonance gives a measure of the degree of damping, hence the Q can be related to the gas viscosity. By consideration of the Navier-Stokes equations and Newton's Laws of Motion, a non-limiting example of an equation of the form shown below can be derived:

$$Q = K \times \frac{1}{\sqrt{\rho \times \omega_0^3}} \times \frac{1}{\sqrt{\eta}} \tag{7}$$

Where K is a constant relating to the stiffness mass and geometry of the member, $\omega_0$ is the angular resonant frequency with no damping, and ti is the fluid viscosity. Combining the Equations (6) and (7), it can be shown that the viscosity of the gas can be determined using a measurement of Q and frequency. Equation (7) is given as a general equation describing the relationship between Q, frequency and viscosity.

FIGS. 3a, 3b, 4a, and 4b illustrate vibratory members 500, 600 for a gas viscometer 700 (see FIG. 6) according to embodiments. The vibratory members 500, 600 may be vibrated at, or near to, a natural (i.e., resonant) frequency. By measuring such a frequency of the vibratory members 500, 600 in the presence of a gas, the viscosity of the fluid can be determined, as will be understood by those skilled in the art. The vibratory members 500, 600 may be formed of metal and constructed of a uniform thickness so that variations and/or imperfections in the member's wall minimally affect the resonant frequency of the vibratory members 500, 600.

Figure 3A:
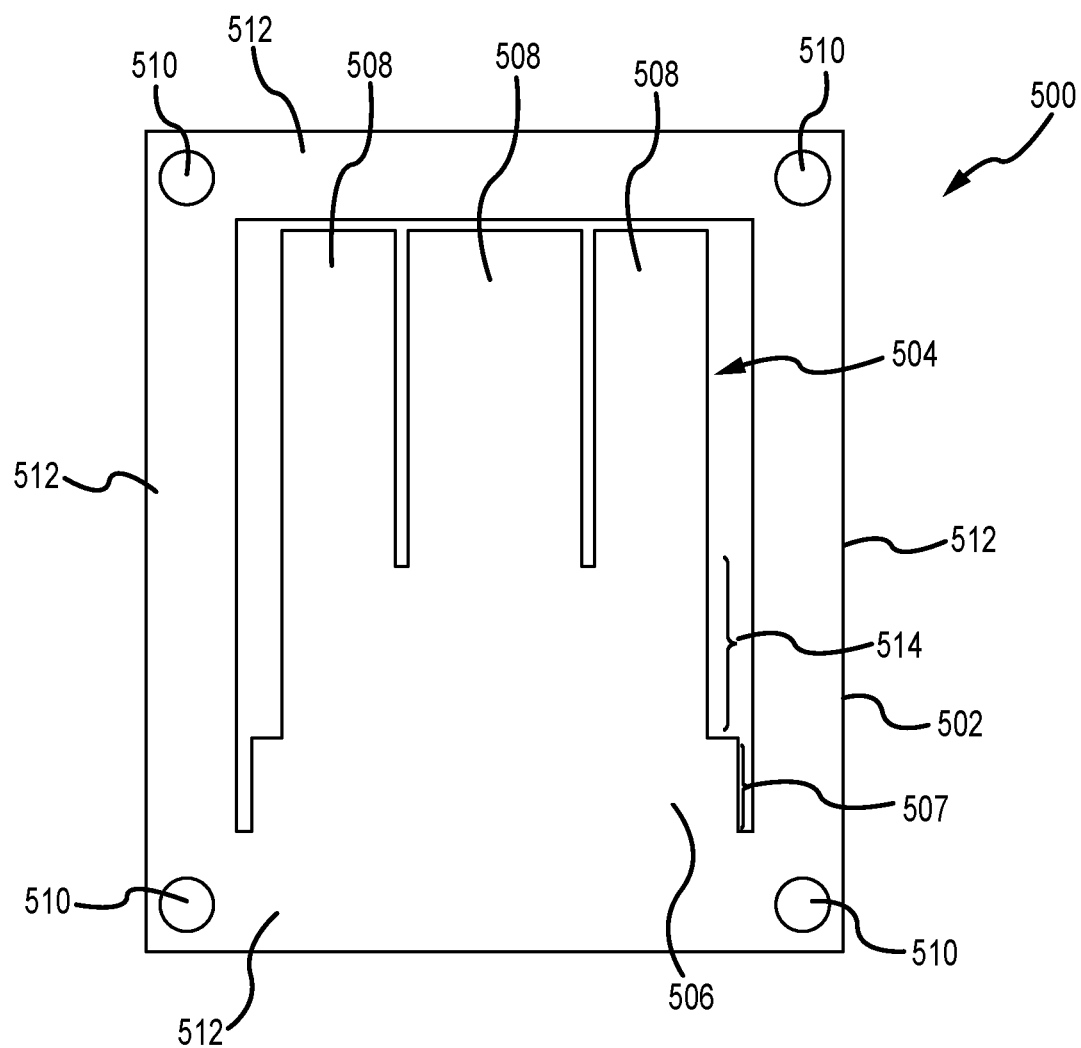
FIGS. 3a and 3b illustrate an embodiment of a vibratory member for a viscometer.
Figure 3B:
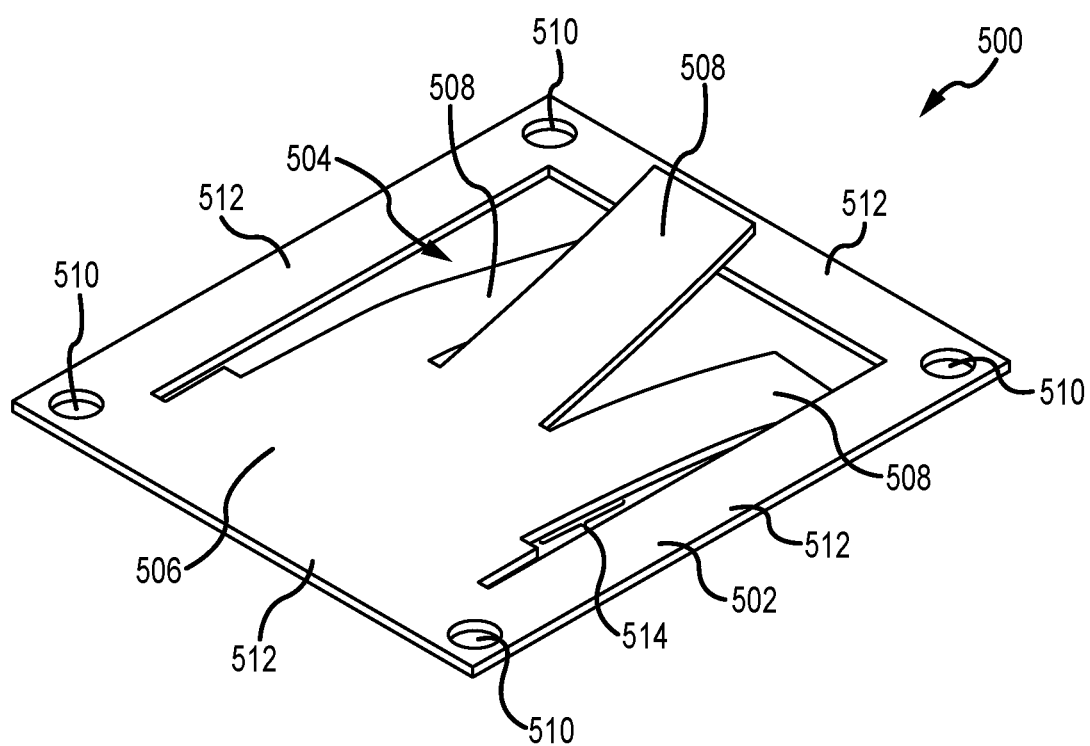

FIGS. 3a and 3b illustrate an embodiment of the vibratory member 500 that comprises a triple beam structure. A body 502 of the vibratory member 500 supports a vibratable portion 504. The vibratable portion 504 is cantilevered, being only supported by a single end 506. A plurality of vibratable beams 508 project from the end 506 and are free to oscillate upon vibratory excitation. The plurality of vibratable beams 508 comprises at least two beams. Three beams are illustrated herein as an example. The size of the beams may be consistent, or beams may differ in shape and/or dimension. In the embodiment illustrated, the end 506 comprises a member that projects from an edge border 512 of the body. In an embodiment, the end 506 and the border 512 of the body 502 comprise the same portion. In the embodiment illustrated, the beams 508 project from a common region 514 located between the edge border 512 and the beams 508. As illustrated, the common region 514 projects from an end region 507 (see FIG. 3a) having a different size and dimension from the common region 514. It will be appreciated, however, that a differentiable end region 507 may not be present in the embodiments, and only a common region 514 may be present. In another embodiment, the beams 508 project directly from the end 506 region. FIG. 3b illustrates the beams 508 undergoing a vibratory motion.

Figure 6:
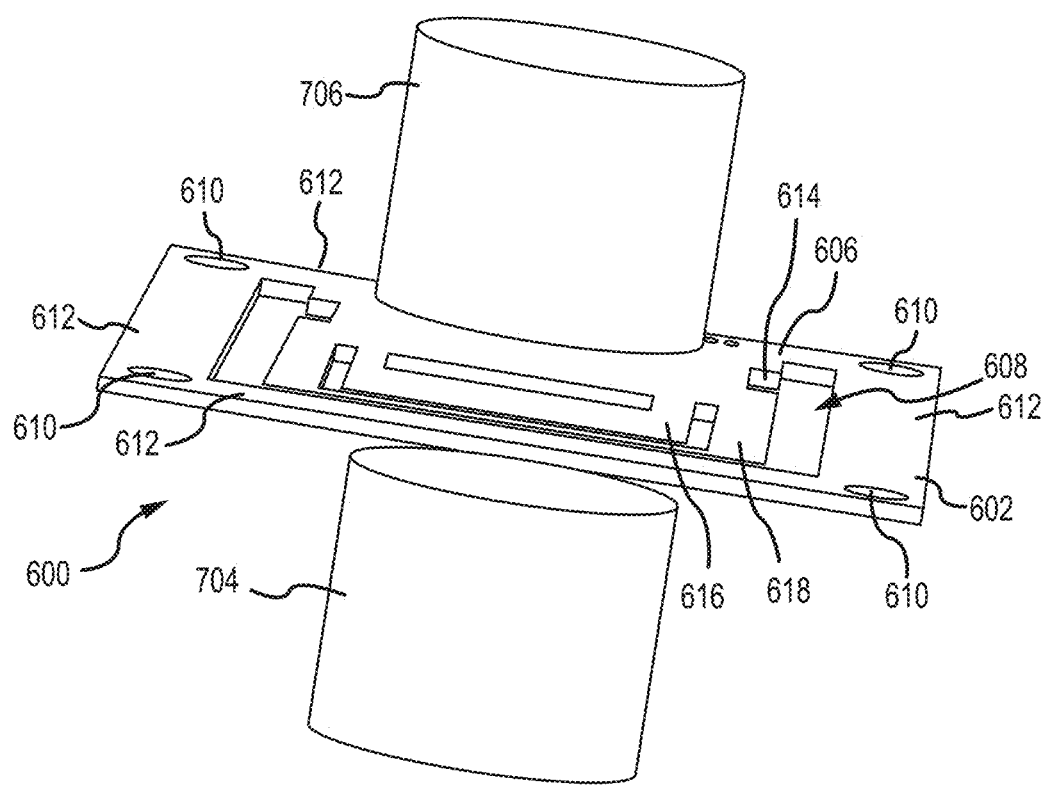
FIG. 6 illustrates another portion of a viscometer according to an embodiment.

Mounting holes 510 may be present to allow the vibratory member 500 to be fastened to a portion of a viscometer 700 (see FIG. 6). It will be appreciated that holes, notches, beams, indexing features, or any other feature may be used to secure the vibratory member 500 to a portion of a viscometer 700, and in some embodiments, no mounting feature may be necessary at all, such as in the case where the vibratory member 500 may be sandwiched between portions of a viscometer 700, for example.

Figure 4A:
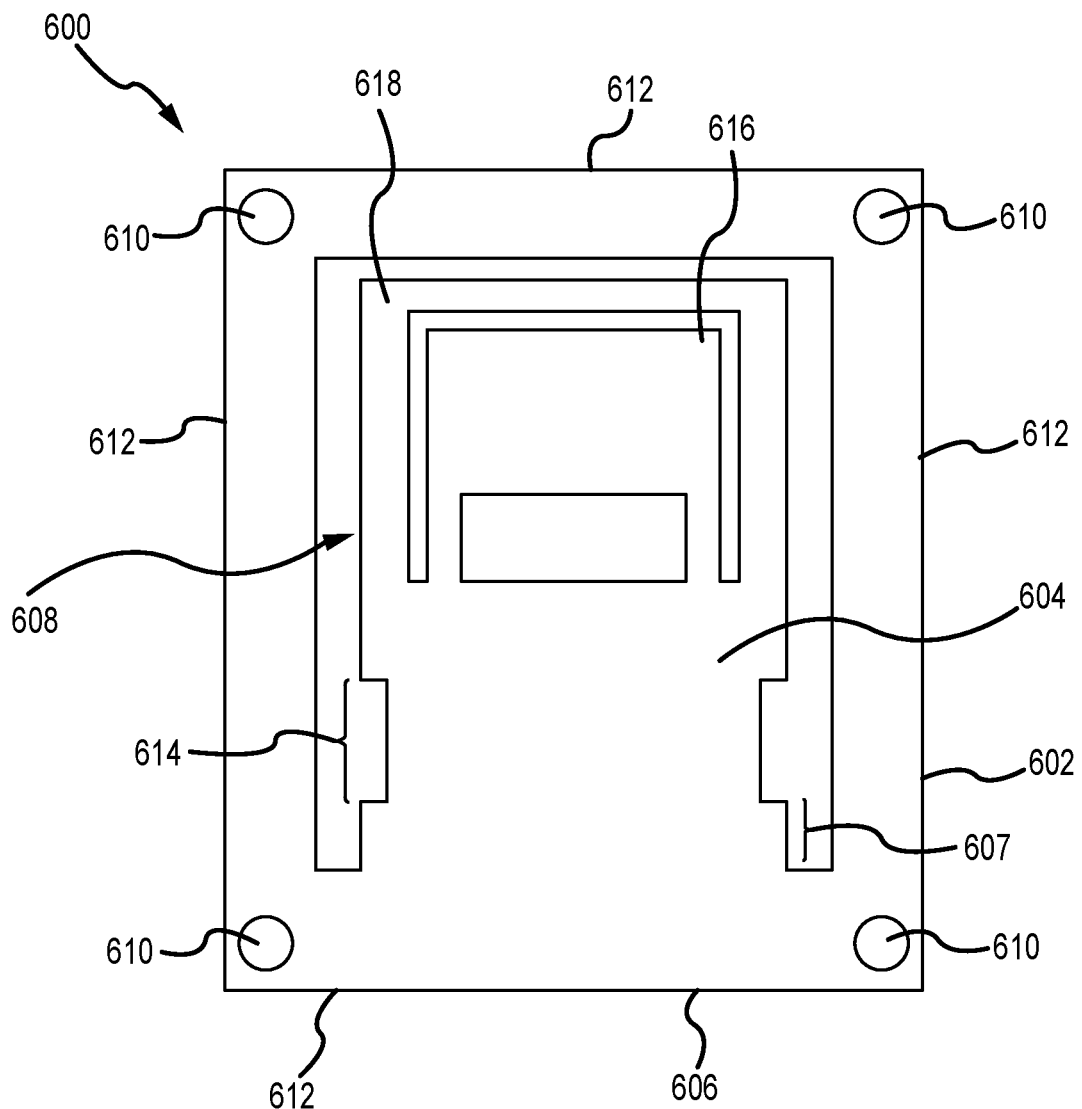
FIGS. 4a and 4b illustrate another embodiment of a vibratory member for a viscometer.
Figure 4B:
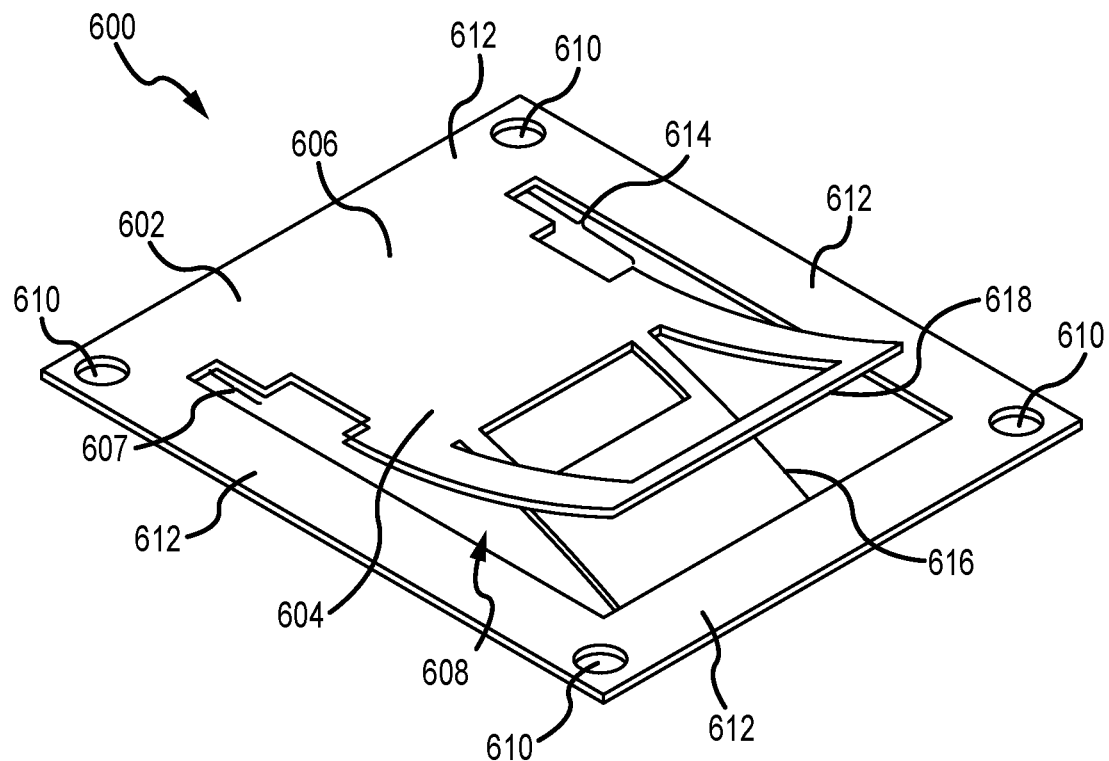

FIGS. 4a and 4b illustrate an embodiment of the vibratory member 600 that comprises a balanced paddle structure. A body 602 of the vibratory member 600 supports a vibratable portion 604. The vibratable portion 604 is cantilevered, being only supported by a single end 606. Vibratable paddles 608 project from the end 606 and are free to oscillate upon vibratory excitation. In the embodiment illustrated, the end 606 comprises a member that projects from a edge border 612 of the body. In an embodiment, the end 606 and the border 612 of the body 602 comprise the same portion. In the embodiment illustrated, the paddles 608 project from a common region 614. In another embodiment, the common region 614 project from an end region 607 having a different size and dimension as the common region 614. It will be appreciated, however, that a differentiable end region 607 may not be present in the embodiments, and only a common region 614 may be present. In an embodiment, the paddles 608 project directly from the end 606. An inner paddle 616 may be nested within an outer paddle 618. FIG. 4b illustrates the paddles 608 undergoing a vibratory motion.

Mounting holes 610 may be present to allow the vibratory member 600 to be fastened to a portion of the viscometer 700. It will be appreciated that holes, notches, beams, indexing features, or any other feature may be used to secure the vibratory member 600 to a portion of a viscometer 700, and in some embodiments no mounting feature may be necessary at all, such as in the case where the vibratory member 600 may be sandwiched between portions of a viscometer 700, for example.

The vibratory members 500, 600 each illustrate a single ended (i.e. cantilevered) structure. The advantage of a single ended structure is that it is substantially insensitive to stresses which can arise in the mounting arrangement of the bodies 502, 602, whereas a double ended structure, devoid of a cantilever, can experience tensile stresses due to mounting or temperature gradient effects. On the other hand, a double ended structure can be more robust and less sensitive to orientation effects which arise from the earth's gravitational pull on the resonator, so although not illustrated, double ended structures are contemplated as embodiments of vibratory members.

The balanced paddle vibratory member 600 provides an advantage in that the surface area of the inner paddle is proportionately relatively large, so vibratory excitation and detection may be easier—especially in embodiments where the vibratory member 600 is physically relatively small. It also has the advantage that proportionately lower operating frequencies can be achieved.

Figure 5:
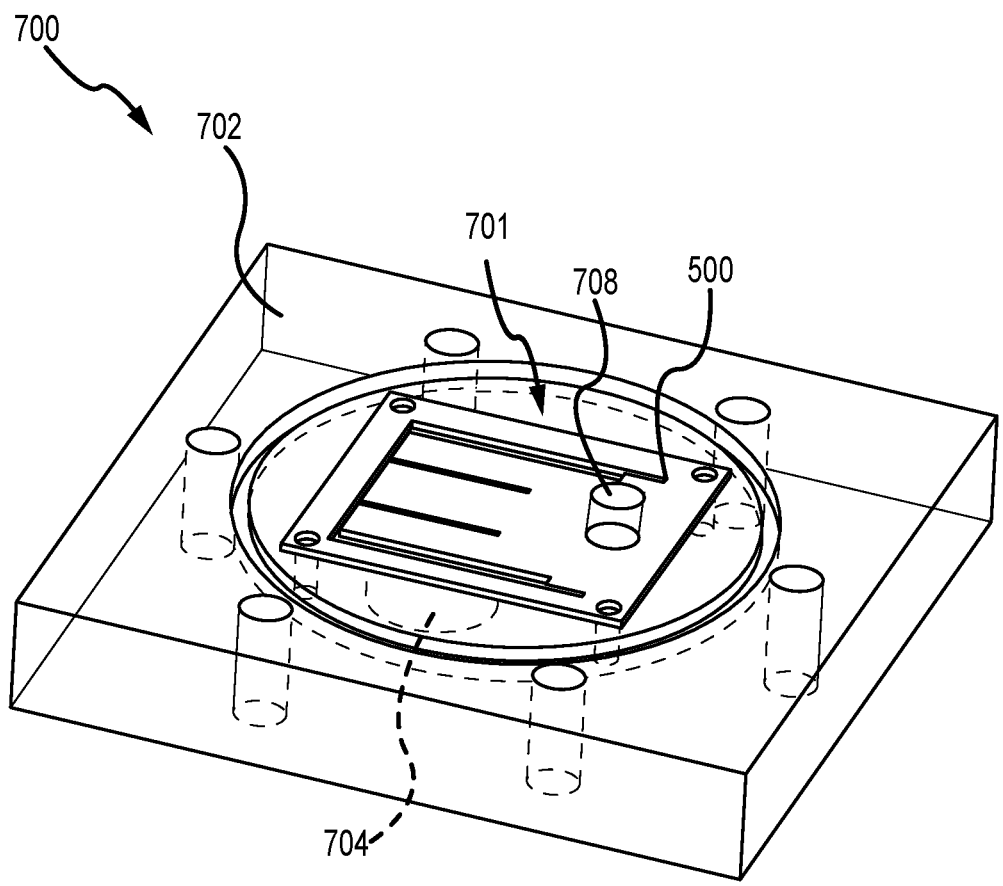
FIG. 5 illustrates a portion of a viscometer according to an embodiment.

FIG. 5 illustrates a viscometer 700 having a vibratory member 500, 600 located at least partially within a housing (not shown for clarity). Due to the planar design of the vibratory member 500, 600, the volume of the cavity 701 around the vibratory member 500, 600 can be much smaller, and the acoustic resonances are configurable to be at a higher frequency compared with the operating frequency. For a typical situation with a narrow gap to the housing above and below the resonator the volume can readily be ten times smaller than the volume required by a prior art vibratory cylinder, thus the Helmholtz resonance is roughly three times higher of a frequency. Note that a narrow housing gap can also be advantageous because this leads to a higher density sensitivity and a higher viscosity sensitivity due to the resultant increased acceleration of the gas through the viscometer 700.

In the illustration, vibratory member 500 is illustrated for an example. Any other vibratory member geometry or configurations may be provided, however. According to an embodiment, the viscometer 700 includes the vibratory member 500 inside the housing. The vibratory member 500, 600 may be permanently or removably affixed to a base 702. In an embodiment, the border 512, 612 regions are secured to the base in a substantially rigid fashion. In an embodiment, portions of the base 702 sandwich the vibratory member therebetween proximate the border 512, 612, yet still allow the vibratable portion 504, 604 to vibrate. The fluid to be quantified may be introduced into, or may be passed through conduits in the base (not shown), such that the fluid under test is in contact with the vibratable portion 504, 604 of the vibratory member 500, 600. The base 702 may include flanges or other members for operatively coupling the viscometer 700 to a pipeline or similar fluid delivering device in a fluid-tight manner. Gas may enter the viscometer 700 via a gas port 708, and may exit in a similar fashion via an exit port (not shown) or through a single gas port 708.

A driver 704 and a vibration sensor (pickoff) 706 (see FIG. 6) are positioned proximate the vibratory member 500, 600. The driver 704 receives a drive signal from a meter electronics and vibrates the vibratory member 500, 600 at or near a resonant frequency. The vibration sensor 706 detects the vibration of the vibratory member 500, 600 and sends the vibration information to a meter electronics for processing.

The meter electronics determines the resonant frequency of the vibratory member 500, 600 and generates a viscosity measurement utilizing the measured Q and frequency.

In an embodiment where the gas viscosity is known and constant, the Q of the resonator and frequency can be used to give a measure of the gas pressure.

Excitation and detection of a vibratory member 500, 600 can be challenging—especially as the size of the resonator is reduced. Ideally, excitation and detection is non-contact because attaching transducers such as piezoelectric elements can only have the effect of degrading the resonance. Using electrostatic excitation and detection, or electromagnetic excitation and detection, is generally difficult because the excitation transducer and detection transducer are close together, and as a consequence there will be direct capacitive or direct transformer coupling between the two. This cross coupling can degrade the detection signal, and in a worst case can completely overwhelm the detection signal so that the electronics cannot identify the resonance. To avoid this cross-coupling, in an embodiment, different methods for excitation and detection are utilized. For example, in an embodiment, electromagnetic excitation and optical detection is utilized, or vice versa.

FIG. 6 illustrates the driver 704 and pickoff or vibration sensor 706 orientation about the vibratory members 500, 600. The base 702 and densitometer 700 in general are omitted for clarity. The driver 704 is adapted to vibrate the vibratory member 500, 600 in one or more vibration modes. The driver 704 may be positioned at any desired location proximate the vibratable portion 504, 604. According to an embodiment, the driver 704 can receive an electrical signal from the meter electronics. In the embodiment shown, the at least one vibration sensor 706 is coaxially aligned with the driver 704. In other embodiments, the at least one vibration sensor 706 may be coupled to the vibratory member 500, 600 in other locations. For example, the at least one vibration sensor 706 may be located on an outer surface of the vibratory member 500, 600.

The at least one vibration sensor 706 can transmit a signal to the meter electronics. The meter electronics can process the signals received by the at least one vibration sensor 706 to determine a resonant frequency of the vibratory member 500, 600. In an embodiment, the driver 704 and vibration sensor 706 are magnetically coupled to the vibratory member 500, 600, thus the driver 704 induces vibrations in the vibratory member 500, 600 via a magnetic field, and the vibration sensor 706 detects vibrations of the vibratory member 500, 600 via changes in a proximate magnetic field. If a fluid under test is present, the Q of the vibratory member 500, 600 will change inversely proportionally to the fluid viscosity as is known in the art.

The proportional change may be determined during an initial calibration, for example. In the embodiment shown, the at least one vibration sensor 706 comprises a coil. The driver 704 receives a current to induce a vibration in the vibratory member 500, 600, and the at least one vibration sensor 706 uses the motion of the vibratory member 500, 600 created by the driver 704 to induce a voltage. Coil drivers and sensors are well known in the art and a further discussion of their operation is omitted for brevity of the description. Furthermore, it should be appreciated that the driver 704 and the at least one vibration sensor 706 are not limited to coils, but rather may comprise a variety of other well-known vibrating components, such as piezo-electric sensors, strain gages, optical or laser sensors, etc., for example. Therefore, the present embodiment should in no way be limited to electromagnetic drivers and sensors.

Furthermore, those skilled in the art will readily recognize that the particular placement of the driver 704 and the at least one vibration sensor 706 can be altered while remaining within the scope of the present embodiments.

Figure 7:
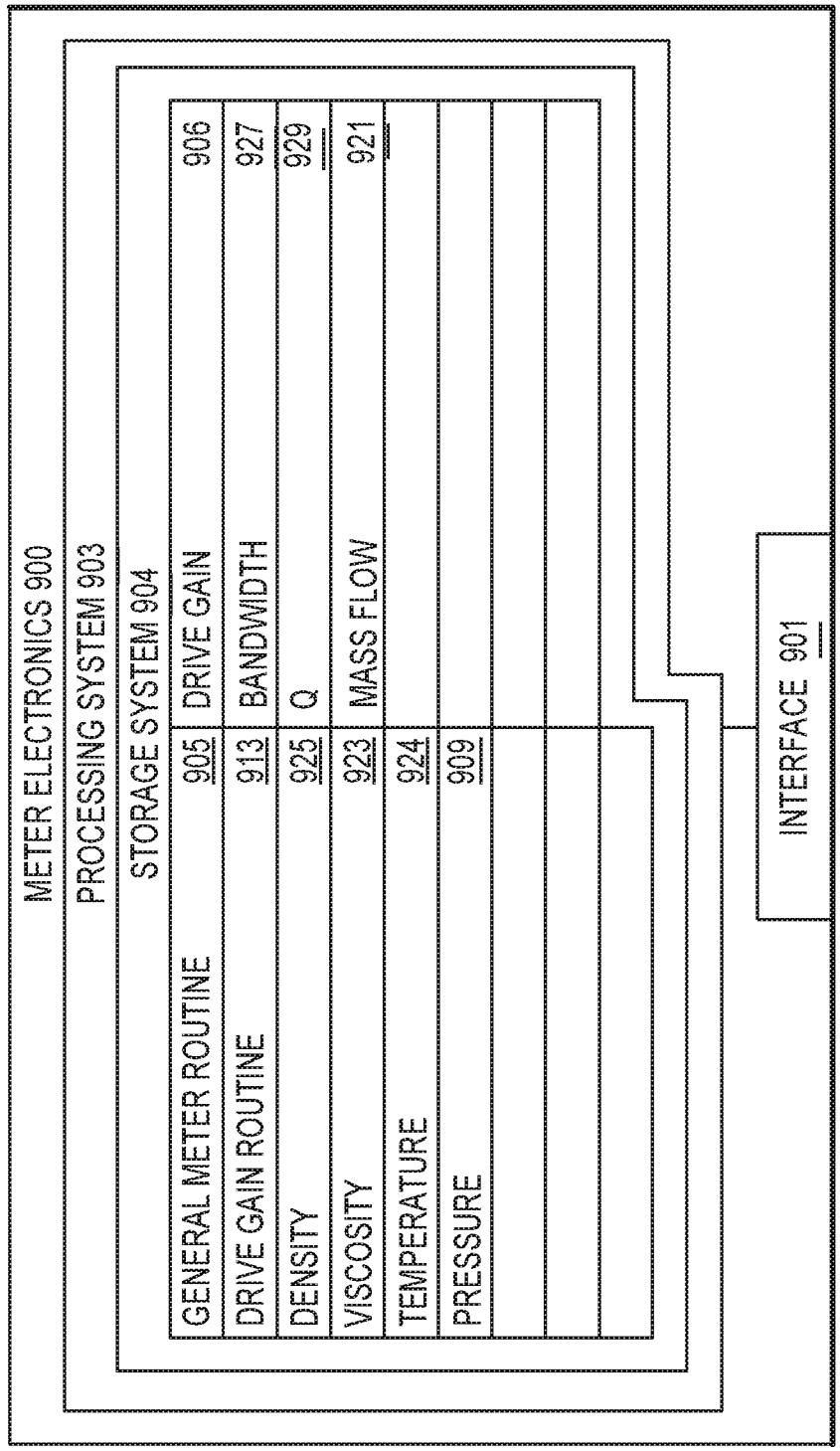
FIG. 7 illustrates meter electronics according to an embodiment.

FIG. 7 is a block diagram of the meter electronics 900 according to an embodiment. In operation, the viscometer 700 provides various measurement values that may be outputted including one or more of a measured or averaged value of density, and viscosity.

The viscometer 700 generates a vibrational response. The vibrational response is received and processed by the meter electronics 900 to generate one or more fluid measurement values. The values can be monitored, recorded, saved, totaled, and/or output.

The meter electronics 900 includes an interface 901, a processing system 903 in communication with the interface 901, and a storage system 904 in communication with the processing system 903. Although these components are shown as distinct blocks, it should be understood that the meter electronics 900 can be comprised of various combinations of integrated and/or discrete components.

The interface 901 may be configured to couple to the leads and exchange signals with the driver 704, pickoffs 706, and temperature or pressure sensors (not shown), for example. The interface 901 may be further configured to communicate over a communication path to external devices.

The processing system 903 can comprise any manner of processing system. The processing system 903 is configured to retrieve and execute stored routines in order to operate the viscometer 700. The storage system 904 can store routines including a general meter routine 905. The storage system 904 can store measurements, received values, working values, and other information. In some embodiments, the storage system stores a mass flow (m) 921, a density ($\rho$) 925, a viscosity ($\mu$) 923, a temperature (T) 924, a pressure 909, a drive gain 906, a vibratable beam bandwidth 927, a Q 929, routines such as the drive gain routine 913 and any other variables or routines known in the art. Other measurement/processing routines are contemplated and are within the scope of the description and claims.

The general meter routine 905 can produce and store fluid quantifications and flow measurements. The general meter routine 905 can generate viscosity measurements and store them in the viscosity 923 storage of the storage system 904, for example. The viscosity 923 value may be determined from the Q 929, as previously discussed and as known in the art.

The vibratory amplitude of the vibratory member 500, 600 peaks at the resonance frequency, which is heavily influenced by the mass and stiffness of the vibratory member 500, 600 itself. At the peak of the resonance (or close to it), the displacement of the member leads the driving force by $\pi/2$ or 90°. In an embodiment, a phase locked loop circuit is provided, where the frequency of the drive signal is governed by the output of a phase comparator that compares the phase between the pick-up signal and the drive signal. The phase locked loop may be configured to always maintain a 90° phase difference between the displacement and the driving signal, and thus always drive the vibratory member 500, 600 at the resonance frequency. Thus, if the drive signal deviates from the resonance then the phase comparator output signal will change the drive frequency until the set phase condition is satisfied. In an embodiment, a voltage controlled oscillator (VCO) is provided in which the output frequency is driven by a voltage from a phase comparator.

Figure 8:
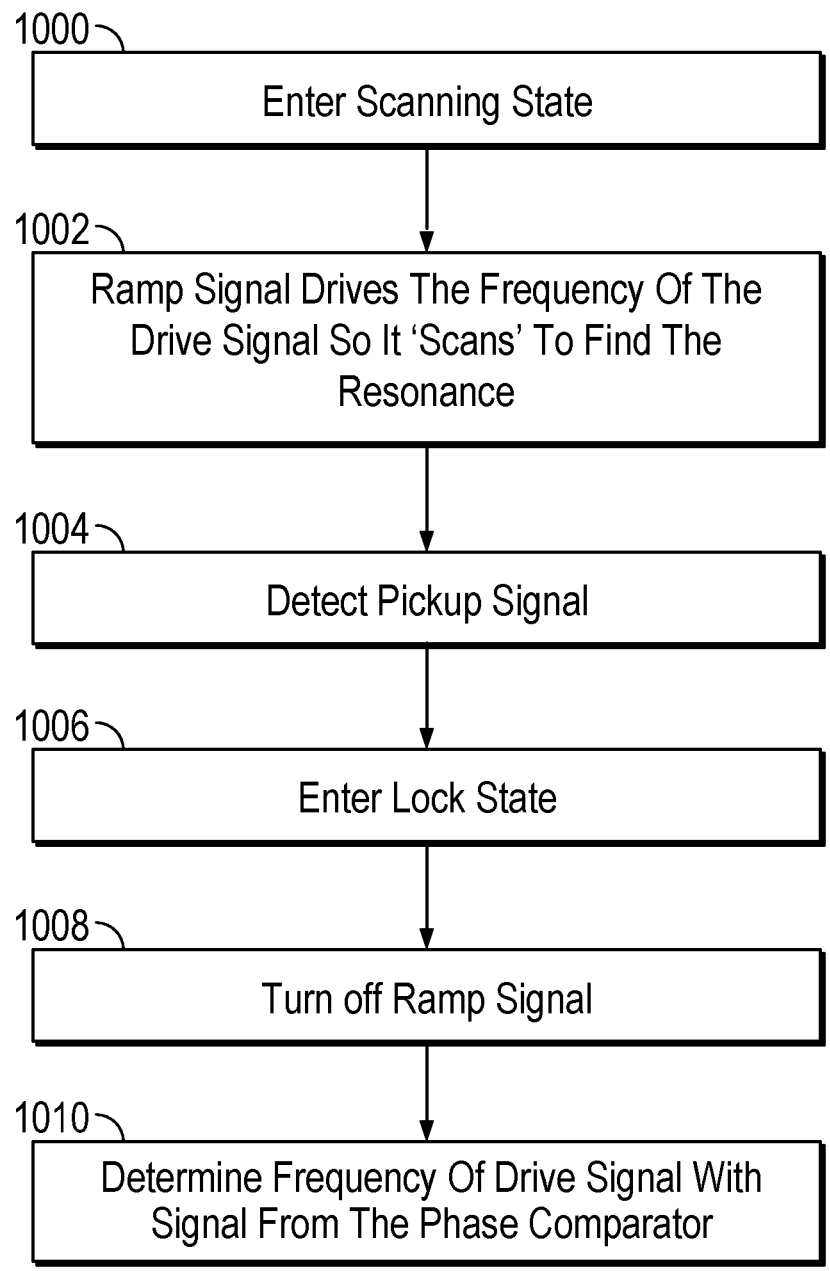
FIG. 8 is a flow chart of an embodiment of drive frequency determination.

In an embodiment, and turning to FIG. 8, in order to lock onto the resonance frequency, a scanning state, a lock state, and a rest state may be reached. In the scanning state 1000, a ramp signal drives the frequency of the drive signal so it 'scans' to find the resonance 1002. When it detects a pick-up signal 1004 it may move in to the lock state 1006. Upon entering the lock state, the ramp signal is turned off 1008 and the signal from the phase comparator determines the frequency of the drive signal 1010. Due to the feedback mechanism described, the phase comparator output signal will force the VCO to drive on resonance, which is a phase difference of 90° between the displacement and the drive signal. Therefore, the vibratory member 500, 600 will always be driven at the resonance frequency. If the resonance moves, then the drive signal will follow it, hence it is said to be locked on to the resonance. In the reset state, if no resonant frequency is found above, the process to find the resonance frequency is 'reset' and started again at a high frequency.

In an embodiment, the Q of the resonance may be measured in conjunction with a phase locked loop circuit. The Quality factor (Q) of a resonance may, in embodiments, be defined as:

$$Q = \frac{\text{Resonant Frequency}}{\text{bandwith}} \qquad (8)$$

As noted, a phase lock loop scheme may be implemented in which the phase set condition is 90°, and the circuit 'locks' on to the peak of the resonance. In an embodiment, the phase lock loop can be configured with a phase set condition of 45° or 135°, which corresponds to points on a frequency response curve having 3 dB of attenuation. 45° or 135° are merely examples, and other phase set points may be utilized, as will be understood by those skilled in the art. In an embodiment, to measure the Q, phase set points may be switched, so that the vibratory member 500, 600 can sequentially operate at the peak of resonance and the 3 dB points (or other phase set point above or below 3 dB) and hence the Q can be calculated from the resonance frequency and the bandwidth.

In another embodiment, viscosity is calculated using calibration constants, Q, and frequency.

The viscosity 923 and other measurements can comprise a substantially instantaneous value, can comprise a sample, can comprise an averaged value over a time interval, or can comprise an accumulated value over a time interval. The time interval may be chosen to correspond to a block of time during which certain fluid conditions are detected, for example, a gas-only fluid state. In addition, other mass and volume flow and related quantifications are contemplated and are within the scope of the description and claims.

The viscosity 923 may be determined from measuring the vibratable beam bandwidth 927, as the bandwidth of the vibratable beams' natural frequency changes with the viscosity of the surrounding fluid. Bandwidth measurements may therefore be converted to viscosity by utilizing a meter calibration coefficient.

The meter electronics 900 may be coupled to a path or other communication link. The meter electronics 900 may communicate density measurements over the path. The meter electronics 900 may also transmit any manner of other signals, measurements, or data over the path. In addition, the meter electronics 900 may receive instructions, programming, other data, or commands via the path.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other vibrating systems, and not just to the embodiments described above and shown in the accompanying figures. Accordingly, the scope of the invention should be determined from the following claims.

What is claimed is:

1. A planar vibratory member affixed to a non-vibratory base by a border thereof of and operable for use in a vibrating gas viscometer, comprising:
   a body comprising the border and a vibratable portion wherein the vibratable portion emanates from the body, wherein the vibratable portion comprises a cantilevered inner paddle nested within an outer paddle;
   wherein the border of the body is non-vibratory, and surrounds the vibratable portion;
   wherein the vibratable portion is operable to be vibrated by a driver.

2. The planar vibratory member of claim 1, wherein the vibratable portion is magnetically drivable.

3. A viscometer operable to determine a viscosity of a gas therein, comprising:
   a driver;
   a planar vibratory member vibratable by the driver, comprising a body and a vibratable portion emanating from the body, wherein the vibratable portion comprises a cantilevered inner paddle nested within an outer paddle;
   a non-vibratory border of the body surrounding the vibratable portion;
   a non-vibratory base having the planar vibratory member affixed thereto;
   at least one pickoff sensor configured to detect vibrations of the vibratory member;
   meter electronics comprising an interface configured to send an excitation signal to the driver and to receive a vibrational response from the at least one pickoff sensor, measure a Q of the planar vibratory member, measure a resonant frequency of the planar vibratory member, and to determine a viscosity of the gas therein using the measured Q and the measured resonant frequency.

4. A method for operating a vibratory viscometer comprising the steps of:
   providing a vibratory viscometer comprising a non-vibratory base and meter electronics in communication with at least one coil;
   affixing a planar vibratory member to the base;
   vibrating a planar vibratory member by the at least one coil, wherein the planar vibratory member comprises a body further comprising a border and a vibratable portion emanating from the body, wherein the vibratable portion comprises an inner paddle nested within an outer paddle;

surrounding the vibratable portion of the body with the border, wherein the border is non-vibratory;

receiving an excitation signal by the at least one coil;

outputting a detection signal from the at least one coil, wherein the at least one coil is operable to alternately act as either a driver or pickoff;

measuring a Q of the vibratory member;

measuring a resonant frequency of the vibratory member and determining a viscosity of a gas introduced into the vibratory viscometer using the measured Q and the measured resonant frequency.

5. The method for operating a vibratory viscometer of claim 4, wherein the at least one coil comprises a first coil and a second coil, and wherein the first and second coil are operable to:

receive simultaneous excitation signals;

drive the vibratory member;

detect a signal from the vibratory member; and provide simultaneous detection signals.

6. The method for operating a vibratory viscometer of claim 4, wherein the first coil and the second coil are magnetically opposed.

7. The method for operating a vibratory viscometer of claim 4, wherein the at least one coil comprises a single coil, wherein the single coil is operable to:

receive excitation signals;

drive the vibratory member;

detect a signal from the vibratory member; and provide detection signals.

8. The method for operating a vibratory viscometer of claim 4, wherein the Q is measured with a phase shift and phase locked loop circuit.

* * * * *